United States Patent [19]

Steury

[11] 4,171,843
[45] Oct. 23, 1979

[54] CAMPER TYPE VEHICLE AND DRIVE ASSEMBLY FOR RAISING THE TOP THEREOF

[76] Inventor: Virgil H. Steury, P.O. Box 75, Goshen, Ind. 46526

[21] Appl. No.: 583,533

[22] Filed: Jun. 4, 1975

[51] Int. Cl.² ............................................. B60P 3/34
[52] U.S. Cl. ...................................... 296/27; 52/66; 296/171
[58] Field of Search ................... 296/23 R, 23 C, 26, 296/27; 52/66, 67; 108/147; 5/63; 74/506; 187/8.59, 52 R; 254/143, 147

[56] References Cited

U.S. PATENT DOCUMENTS

| | | | |
|---|---|---|---|
| 2,905,463 | 9/1959 | Borden | 187/52 R X |
| 3,283,732 | 11/1966 | Oja et al. | 5/63 X |
| 3,495,866 | 2/1970 | Bontrager | 296/27 |
| 3,508,782 | 4/1970 | Hostetler | 296/27 |
| 3,674,305 | 7/1972 | Steury | 296/27 X |
| 3,701,561 | 10/1972 | Friesen | 296/27 |
| 3,749,439 | 7/1973 | Ferguson | 296/26 |
| 3,885,826 | 5/1975 | Kropf | 296/23 R |

FOREIGN PATENT DOCUMENTS 1203478 10/1958 France ..................................... 108/147

Primary Examiner—Trygve M. Blix
Assistant Examiner—Winston H. Douglas
Attorney, Agent, or Firm—Trexler, Wolters, Bushnell & Fosse, Ltd.

[57] ABSTRACT

A mobile type housing is provided with a plurality of telescopic movable support elements which are mounted on a base structure for movably supporting the top of the mobile housing between a lowered position and a raised position relative to the base. A pair of lugs are mounted to the base for simultaneous movement between first positions and second positions, the movement of the lugs being substantially parallel and in opposite directions to one another. A plurality of flexible, elongated, incompressible connector elements are connected between the pair of lugs and respective ones of the support members for movement with the lugs during raising and lowering of the top from its respective lowered position and raised position. Drive means is coupled to the pair of lugs to effect simultaneous movement thereof between their first and second positions.

10 Claims, 6 Drawing Figures

CAMPER TYPE VEHICLE AND DRIVE ASSEMBLY FOR RAISING THE TOP THEREOF

BACKGROUND OF THE INVENTION

This invention relates generally to mobile housing such as trailers and campers, and more particularly to a mobile housing having a retractible top portion movable between raised and lowered positions by means of a drive assembly.

Heretofore, campers, trailers and mobile housings of the type displaying retractible or collapsible tops have been generally known and include, for the most part, a plurality of elongated axially movable corner posts or supports mounted to a housing base and supporting the top for movement between a retracted or lowered position and an extended or raised position relative to the base. Typically, this type of vehicle housing relies on individual extractor elements or drive assemblies for axially moving each corner post to an extended position to thereby raise the top relative to the base. This method of utilizing separate actuating means for each corner post or support not only adds to the complexity of the entire vehicle but lends to further disadvantages. For example, it has been found that after continued use and wearing of the components, the actuating mechanisms tend to become unsynchronized with respect to each other, thereby causing the top to raise in a further uneven manner which, as is readily apparent, allows for the possibility of jamming or sticking, so that the top never reaches its maximum height. In addition, once the top is jammed in a raised position, it becomes quite difficult to move to its lowered position.

Improvements have been incorporated in such campers, trailers and other movable trailer vehicles to effect simultaneous movement of the adjustable corner posts during the raising and lowering operation. One such prior art structure has a single movable lug slidably secured to the support base of the trailer and to which are connected a plurality of incompressible, flexible connector elements which extend through guide tubes and then into the vertical corner posts. However, the length of the respective different ones of the flexible, incompressible connector elements varies from one to another and, therefore, may tend to cause inconsistencies in the rate at which one corner post is raised relative to the other corner post.

Accordingly, a general object of the present invention is to provide a new and improved drive assembly for raising the top of a mobile type housing such as a camper or trailer, which drive assembly includes means which enable the flexible, incompressible connector elements to be of substantially the same length and configuration.

Another object of the present invention is to provide a new and improved drive assembly which raises the top of a retractible type camper or trailer more uniformly at the four corners thereof.

A feature of the present invention is the utilization of a pair of movable lugs slidable relative to one another along parallel paths and in opposite directions, these lugs being tied together to a single drive cable.

Another object of the present invention is to provide a new and improved drive assembly which raises the top of a retractible type camper or trailer in a manner which more uniformly raises each corner of the type at substantially the same rate.

The aforementioned objects are achieved and the prior art deficiencies eliminated by the utilization of a novel drive assembly for raising the top of a mobile type housing such as a trailer or camper having a plurality of axially and telescopically movable elongated corner posts or support members mounted to the housing's base and supporting the housing's top for movement between a lowered or retracted position when the trailer is in transit and in an extended or raised position when the trailer is in use.

The drive assembly, in accordance with the present invention, includes a master tube in the form of an elongated housing having a partition extending therethrough to form two spaced apart channels. A lug element or movable member is slidably secured within each of the channels for movement therealong, the lugs being movable in opposite directions from a single drive cable. Two of the flexible, incompressible cables are secured to one lug and extend therefrom to two corner posts while another two flexible and incompressible cables are secured to the other lug and extend to the other two corner posts. The single drive cable is wrapped about a heavy duty pulley so that one portion of the cable being moved in one direction will cause another portion of the cable to move in the opposite direction. By so providing a guide tube having two channels and a pair of movable lugs the flexible elongated incompressible connectors are laterally made of the same length and configuration.

Each of the connector elements or push rods extending from the lugs is guided in its respective secondary guide member which restricts the push rod to axial movement as opposed to buckling or flexing type movement. In this manner, as the propulsion block or lugs are moved from their first positions to their second positions, for example with the use of a winch, the push rods or connector elements are axially moved toward their corner posts for telescopically raising the corner posts during raising of the top of the camper or trailer. Since the various push rods move equal distances, corresponding to the movement of the various lugs, and are of the same length and configuration, a more unison movement of the top is achieved. In addition, since all of the push rods and therefore corner posts are driven by a single cable, complicated gear arrangements are eliminated.

Many other objects, features and advantages of this invention will be more fully realized and understood from the following detailed description when taken in conjunction with the accompanying drawings wherein like references throughout the various views of the drawings are intended to designated similar elements or components.

DETAILED DESCRIPTION OF THE ILLUSTRATED EMBODIMENT

Figure 1:
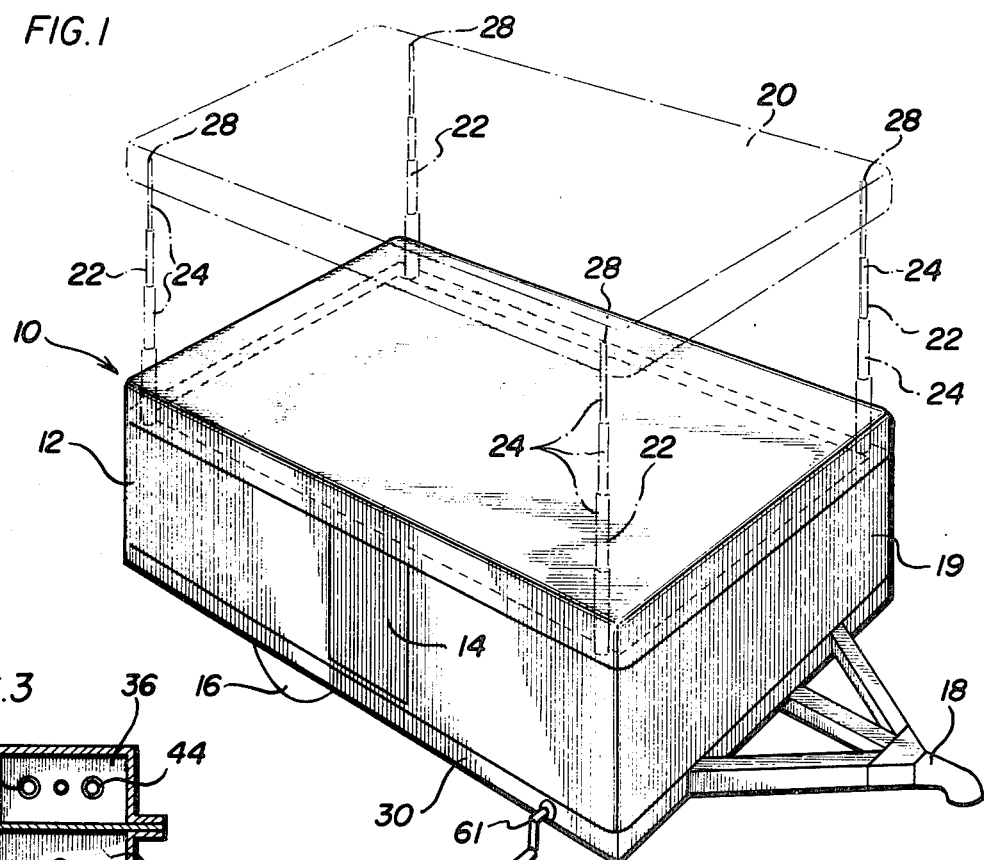
FIG. 1 is a perspective view of a mobile type housing constructed in accordance with the principals of the present invention, the housing displaying a retractible top as shown in both solid and dotted lines.
Figure 3:
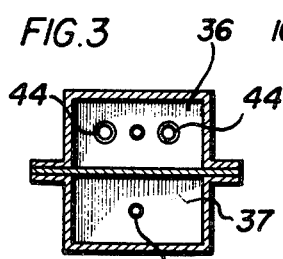
FIG. 3 is a sectional view taken along line 3—3 of FIG. 2 illustrating the master guide element divided into two elongated channels.

Turning now to the drawings wherein like reference numerals throughout the various views of the drawings are intended to designate similar elements and components. A mobile housing or trailer is illustrated and constructed in accordance with the principals of this invention and designated generally by reference numeral 10. The trailer includes a body or base 12 having a door 14 for entry therein and is supported for transportation on a pair of laterally spaced apart wheels 16. A typical trailer hitch assembly 18 extends from the front end 19 of the body or base assembly 12 and is used for connecting the trailer 10 to an automobile or other suitable vehicle (not shown) for transport thereof. The trailer structure 10 further includes a substantially rectangular top portion 20 supported by four elongated telescopically and axially movable hollow corner posts or support members 22 for movement between a retracted or lowered position relative to the base 12, as illustrated by the solid lines in FIG. 1, and an extended or raised position, as illustrated by the dotted lines of FIG. 1.

Figure 2:
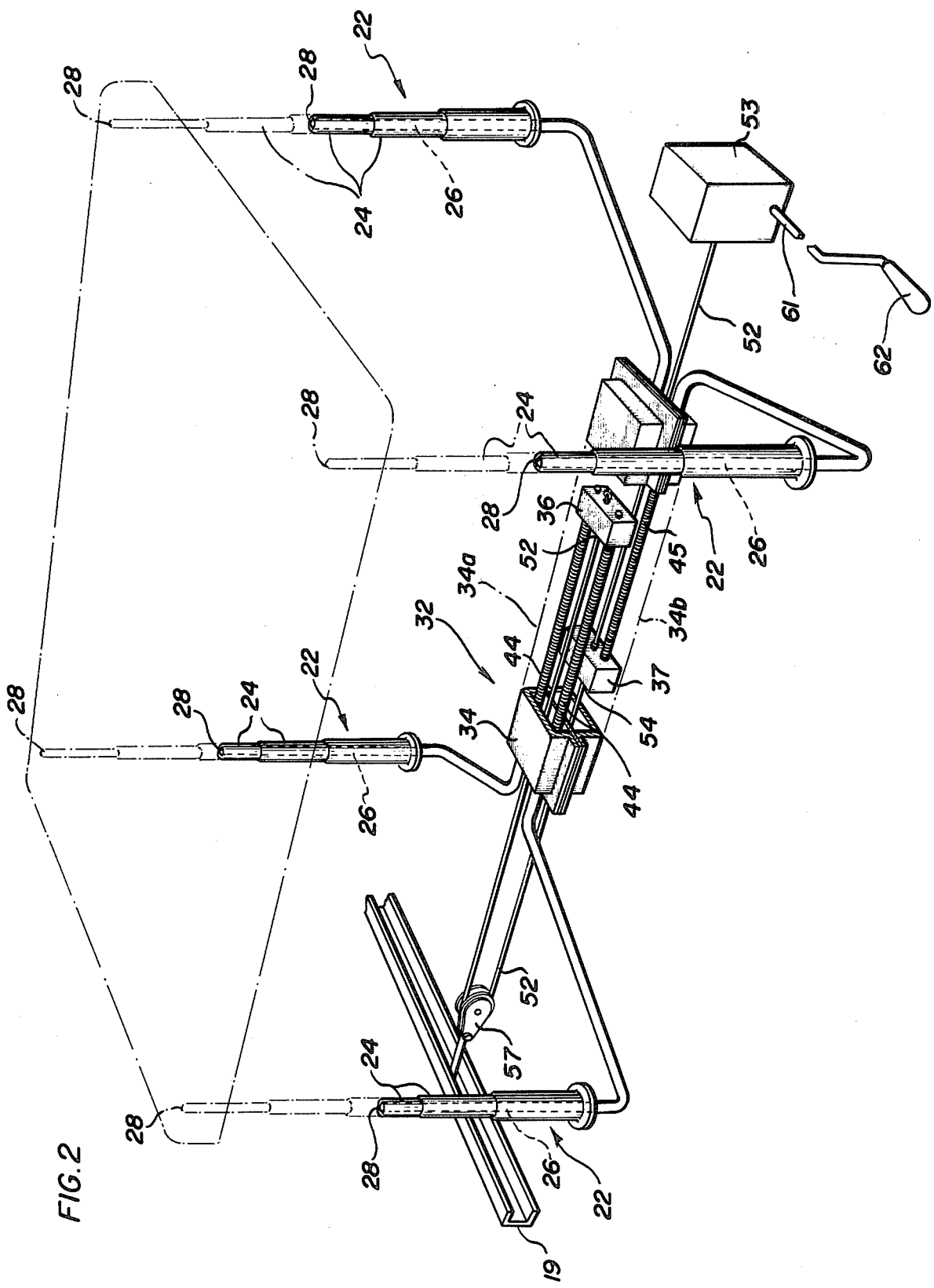
FIG. 2 is a diagrammatic perspective view of the drive assembly used for raising and lowering the top of the mobile type housing of FIG. 1.

As illustrated in FIG. 2, the corner posts or support members 22 include a plurality of concentric telescopic sections 24 which define an axial passageway 26 extending through the entire corner post and terminating at the top closed end 28 thereof which is the innermost concentric telescopic section. Each corner post is mounted to and through a floor section 30 of the body or base portion 12 at or near the corners thereof, and extends vertically upwardly into a corresponding slot or socket provided at the corners of the top 20. In this manner, as the corner-posts or support members are driven from their telescopically retracted position to their extended position, the top 20 is driven from its retracted or lowered position to its extended or raised position. While four corner posts are here illustrated, it will be understood that the invention described herein contemplates any number of such corner posts, depending upon the size and shape of the trailer 10.

In order to move the corner posts 22 from their retracted to their extended positions and therefore raise the top 20, a central unitary drive assembly 32 is provided. The unitary drive assembly 32 is constructed in accordance with the present invention and clearly illustrated in FIGS. 2, 4 and 5 as including a master tube or guide element 34 in the form of an elongated rectangular housing which is divided into two adjacent rectangular channels or chambers 34a and 34b, one positioned above the other. A pair of movable lugs 36 and 37 are slidably secured within the channels 34a and 34b, respectively, for simultaneous movement in opposite directions from one another and along parallel spaced apart paths.

Figure 4:
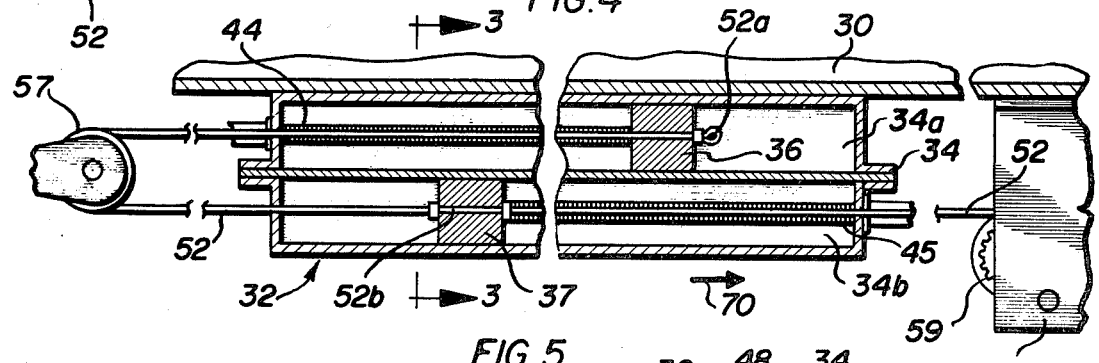
FIG. 4 is a side view of the master channel and single drive cable extending therethrough for movement in opposite directions.

As seen in FIG. 4, the master tube 34 is supported externally to the floor section 30 of the base 12. The master tube 34 can be secured by any suitable means such as bolts, rivets, or welding. While the master tube is here illustrated positioned longitudinally of the trailer or camper structure it will be understood that it can be secured transverse to the direction of travel if desired, or diagonally from corner to corner depending on the size and shape of the trailer. It should also be understood that the invention herein disclosed and claimed is not limited to a rectangular shape master tube and propulsion blocks or lugs, but rather contemplates any reasonable shape, such as cylindrical, circular or the like, so long as proper operation is maintained.

Figure 5:
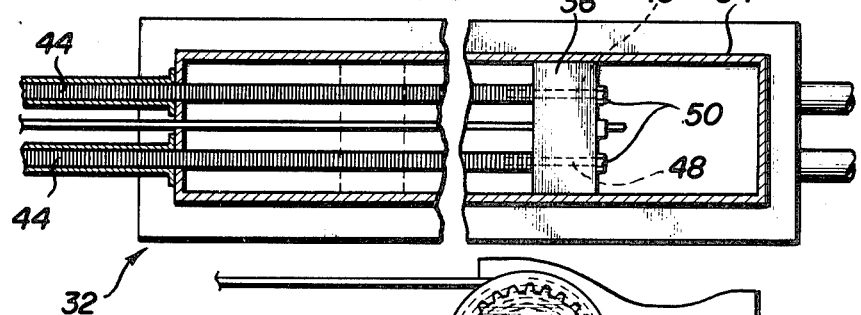
FIG. 5 is an enlarged fragmentary view showing the movable lugs secured to the cable for movement in unison therewith.
Figure 6:
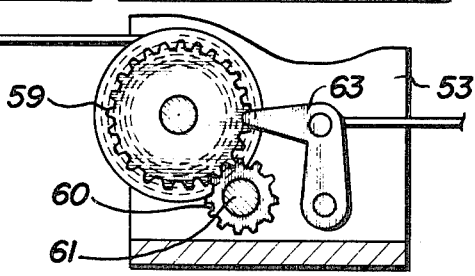
FIG. 6 is a view illustrating some of the details of a winch connected to the cable for holding the top in a fixed position after it is raised.

As seen in FIGS. 4 and 5, two equally laterally spaced apart flexible push rods 44 are secured to the propulsion block 36 while a second pair of laterally spaced apart flexible push rods 45 are mounted to the propulsion block 37. In the illustrated embodiment, the length of the push rods is substantially identical to one another, and each push rod is substantially of the same configuration as the other except that two push rods may be considered as having a right hand configuration and two considered as having a left hand configuration. As illustrated, the push rods 44 are in the form of highly convoluted coiled spring members which for reasons to be made apparent below permit substantially no compression or expansion in the axial direction which is otherwise typical of springs displaying a lesser number of convolutions per unit length. The push rods are rigidly mounted to their respective propulsion blocks 36 and 37 by a corresponding threaded bolt 48 which also is threaded into the end of its corresponding push rod. Heads 50 of the bolts 48 engage the end of the lug and are pulled with the lug to push the spring elements 44 and 45 in their respective directions.

In accordance with one aspect of this invention, a single cable 52 is moved toward a winch assembly 53. The cable 52 has one end 52a thereof secured to the lug 36 and a central portion 52b secured to the lug 37, as best seen in FIG. 4. The other end of the cable 52 extends toward and is engaged with the winch assembly 53. The cable 52 is wrapped about a pulley 57 which, in turn, is secured to the lower frame portion 19.

The winch 53 includes a gear 59 engageable by a second gear 60 which, in turn, is coupled to a hand operated crank shaft 61 and lever arm 62. A locking pawl 63 is provided to maintain the winch in a locked position after the top 20 has been raised to the desired height. Upon unlocking the winch, the weight of the top 20 will cause the incompressible connector elements 44 and 45 to be urged downwardly through their conduit elements 56 which, in turn, will cause the telescopic sections 24 to collapse one within the other.

When raising the top 20, the hand crank 62 is operated to pull the cable 52 in the direction as indicated by the arrowed line 70, FIG. 4. This will cause the lug 37 to move in the same direction. The cable 52 is then wrapped about a pulley 57 and causes the other portion of the cable to move in the opposite direction. This will cause lug 36 also to move in the opposite direction of the lug 37. Lugs 36 and 37 move simultaneously in opposite directions, and along substantially parallel paths, to cause the connector elements 44 and 45 simultaneously to move therewith. This arrangement substantially simplifies the construction of trailer or camper units of the type disclosed herein in that the corner posts can now be constructed of substantially the same lengths of components and of substantially the same configuration.

While a preferred embodiment of the invention has been shown, it should be understood that the invention is not limited thereto, since many modifications may be made. It is, therefore, contemplated to cover any such modification that falls within the spirit and scope of the following claims:

The invention is claimed as follows:

1. A mobile type housing comprising: a base portion, a top portion, a plurality of telescopic movable support members mounted on said base portion for supporting said top portion between a lowered position and a raised position relative to said base portion, a pair of lugs mounted on said base portion for movement between first positions and second positions, a plurality of flexible elongated incompressible connector elements each having one end thereof connected to one of said pair of lugs and another plurality of connector elements each having one end thereof connected to the other of said lugs, the other end of each of said flexible elongated connector elements respectively being connected to said support members at the innermost part thereof for moving said top portion from said lowered position to said raised position in response to simultaneous movement of said pair of lugs from their first positions to their second positions, drive means for simultaneously moving said lugs from their first positions to their second positions, said drive means including a single cable having end terminations with a first end termination secured to one of said pair of lugs and an intermediate portion secured to the other of said pair of lugs and a second end termination of said cable secured to a winch for winding and unwinding the cable portion between said second end termination and the secured intermediate portion, a pulley secured to said base for receiving said cable therethrough at a portion of the cable between said secured intermediate portion and said first end termination, whereby the portion of the cable going into said pulley moves in the opposite direction of the portion coming out of said pulley, and including a central, single master guide tube secured to said base portion, said pair of cable-pulled lugs slidably positioned within said master guide tube for linear movement therein in opposite directions.

2. A movable type housing according to claim 1 wherein said plurality of connector elements are substantially of the same length between their respective lugs and their respective support means.

3. A movable type housing according to claim 1 wherein said lugs move parallel to one another and in opposite directions.

4. A mobile type housing according to claim 1 wherein said master guide tube includes a partition means for defining a pair of elongated chambers for receiving one lug in one chamber and the other lug in the other chamber.

5. A mobile type housing according to claim 1 wherein said connector elements are axially movable along with said lugs, the assembly further including secondary guide means for restricting the connector elements to axial movement thereby to prevent buckling thereof.

6. A mobile type housing according to claim 5 wherein said secondary guide means includes a like plurality of rigid elongated tubes, each of which is mounted on said base and receives therethrough a portion of a corresponding connector element.

7. A mobile type housing according to claim 1 wherein said drive means for moving said lugs includes a winch assembly mounted on said base and connected to said lugs for moving said lugs from their first positions to their second positions, said winch assembly including locking means for maintaining the top portion in said raised position.

8. A mobile type housing according to claim 7 wherein said winch assembly includes handle means for actuating said winch assembly and means for unlocking said winch assembly whereby to allow said top to move to its lowered position, said handle means being positioned a substantial distance from said means for locking said winch assembly whereby not to interfere with the operation of said last mentioned means.

9. A drive assembly for raising the top of a housing relative to the base thereof as set forth in claim 1 wherein said plurality of connector elements are substantially of the same length between their respective lugs and their respective support means.

10. A drive assembly for raising the top of a housing relative to the base thereof as set forth in claim 1 wherein said first and second groups of connector elements each include one half the total number of connector elements.

* * * * *